(12) United States Patent
Kottkamp et al.

(10) Patent No.: US 8,964,583 B2
(45) Date of Patent: Feb. 24, 2015

(54) APPARATUS AND METHOD FOR MEASURING CHANNEL QUALITY FEEDBACK OF MOBILE STATIONS

(75) Inventors: Meik Kottkamp, Munich (DE); Andreas Roessler, Keller, TX (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 331 days.

(21) Appl. No.: 13/499,033

(22) PCT Filed: Aug. 17, 2010

(86) PCT No.: PCT/EP2010/005051
§ 371 (c)(1),
(2), (4) Date: Jun. 13, 2012

(87) PCT Pub. No.: WO2011/038806
PCT Pub. Date: Apr. 7, 2011

(65) Prior Publication Data
US 2012/0250556 A1 Oct. 4, 2012

(30) Foreign Application Priority Data
Sep. 29, 2009 (DE) .......................... 10 2009 043 439

(51) Int. Cl.
*H04L 12/26* (2006.01)
*H04B 17/00* (2006.01)

(52) U.S. Cl.
CPC ........ *H04B 17/0042* (2013.01); *H04B 17/0057* (2013.01); *H04B 17/0065* (2013.01); *H04B 17/0067* (2013.01)
USPC ......................................................... 370/252

(58) Field of Classification Search
None
See application file for complete search history.

(56) References Cited

U.S. PATENT DOCUMENTS

| 2004/0071202 A1* | 4/2004 | Won et al. ..................... 375/227 |
| 2006/0023745 A1 | 2/2006 | Koo et al. |

(Continued)

FOREIGN PATENT DOCUMENTS

| CN | 101322327 A | 12/2008 |
| JP | 2008-177732 A | 7/2008 |

(Continued)

OTHER PUBLICATIONS

3rd Generation Partnership Project; Technical Specification Group Radio Access Network; User Equipment (UE) radio transmission and reception (FDD) (Release 8), 2009, pp. 1-215, 3GPP Organizational Partners, France.
English Translaton of International Written Opinion for PCT/EP2010/005051 dated Apr. 12, 2012, pp. 1-8.
International Preliminary Report on Patentability dated Apr. 12, 2012, pp. 1-2.

*Primary Examiner* — Minh-Trang Nguyen
(74) *Attorney, Agent, or Firm* — Ditthavong & Steiner, P.C.

(57) ABSTRACT

A measuring device for determining the channel-quality feedback quality of mobile stations contains a base station, a mobile station and a measuring unit. The measuring unit contains at least two antennas and a processing device. The measuring unit and the mobile station receive signals in each case by means of at least two antennas from the same at least two antennas of the base station. The mobile station determines a channel-quality feedback value from the signals it has received. The processing device determines the orthogonality of the signals received by the measuring unit. The processing device determines a channel-quality feedback value from the orthogonality. From this and from the channel-quality feedback value of the mobile station, the processing device determines the quality of the latter.

13 Claims, 4 Drawing Sheets

(56) References Cited

U.S. PATENT DOCUMENTS

| | | |
|---|---|---|
| 2007/0064632 A1 | 3/2007 | Zheng et al. |
| 2009/0067530 A1 | 3/2009 | Ashikhmin |
| 2009/0190520 A1* | 7/2009 | Hochwald et al. ............ 370/315 |
| 2010/0238824 A1* | 9/2010 | Farajidana et al. ........... 370/252 |

FOREIGN PATENT DOCUMENTS

| | | |
|---|---|---|
| JP | 2009-21980 A | 1/2009 |
| WO | WO 2005/008944 A1 | 1/2005 |
| WO | 2007/064249 A1 | 6/2007 |

* cited by examiner

APPARATUS AND METHOD FOR MEASURING CHANNEL QUALITY FEEDBACK OF MOBILE STATIONS

BACKGROUND

The invention relates to a measuring device for determining the channel-quality feedback quality from mobile stations within mobile radio communications systems and a method for determining the channel-quality feedback quality of mobile stations within mobile radio communications systems.

Mobile stations in mobile radio systems conventionally report to the base station connected with the mobile station regarding the quality of the communications channel in a channel-quality feedback message, referred to below as a channel-quality feedback. A maximization of the transmission rate attainable with a given spectrum is achieved, for example, by adapting the modulation method. In this manner, the base station can guarantee an optimum transmission. Conventionally, the signal-noise ratio of received, known data is determined for this purpose by the mobile station. A channel-quality feedback (channel-quality feedback) is generated from this and transmitted back to the base station.

For example, the U.S. patent application U.S. 2007/0064632 A1 discloses a mobile-radio system, in which mobile stations transmit a channel-quality feedback to the base station. On the basis of the channel-quality feedback of the mobile station, the base station adjusts the modulation. In this manner, an increase in the attainable transmission rate is possible.

In future mobile-radio systems, MIMO (Multiple In Multiple Out; multiplex input-multiplex output) will be used, this means that several transmission antennas and several reception antennas are used in each case. To achieve a further increase in capacity, different data can be transmitted via the several transmission antennas. The signal-noise ratio of the several individual communications channels is now no longer sufficient to provide a reliable evaluation of the channel quality.

SOME EXEMPLARY EMBODIMENTS

The invention is based on the object of providing a measuring device and a measuring method for determining channel-quality feedback values and accordingly for evaluating the channel-quality feedback quality of mobile stations with high precision.

This object is achieved according to the invention for the device by the features of the independent claim 1 and for the method by the features of the independent claim 10. Advantageous further developments form the subject matter of the dependent claims referring back to these claims.

A measuring device according to the invention for mobile stations comprises a base station, a mobile station and a measuring unit. The measuring unit in this context comprises at least two antennas and a processing device. The measuring unit and the mobile station each receive signals by means of at least two antennas from the same at least two antennas of the base station. The mobile station determines a first channel-quality feedback value from the signals it has received. The processing device determines the orthogonality of the signals received by the measuring unit. The processing device determines a second channel-quality feedback value from the orthogonality.

The processing device advantageously determines from this and from the channel-quality feedback value of the mobile station the quality of the latter. Accordingly, an accurate evaluation of the quality of the channel-quality feedback value of the mobile station is possible at low cost.

The mobile station preferably determines the signal-noise ratio from the signals it has received, and from this, determines a third channel-quality feedback value. A very simple determination of the channel-quality feedback value is possible in this manner.

The mobile station preferably determines the orthogonality of the signals it has received from the at least two antennas of the base station and determines from this a fourth channel-quality feedback value. A high precision in the evaluation of the channel-quality feedback value of the mobile station is possible in this manner.

The measuring unit and the mobile station are preferably connected to one another via a data line or a radio link. In this manner an evaluation of the channel-quality feedback value of the mobile station is possible on the basis of payload data.

The processing device preferably determines the orthogonality of the received signals on the basis of known signal portions of the signals transmitted from the base station. A very simple determination of the channel-quality feedback value is possible in this manner.

During the measurement, the mobile station preferably sets up a communications connection with the base station. In this context, the measuring unit preferably sets up no communications connection with the base station. The processing device preferably determines the orthogonality on the basis of control-channel signals of the base station received by the measuring unit. A very simple determination of the channel-quality feedback value is possible in this manner. In particular, no decoding of transmitted payload data is required.

As an alternative, during the measurement, the mobile station and the measuring unit each set up a communications connection with the base station. A very precise determination of the channel-quality feedback value is possible in this manner, because the measuring unit also receives and can decode payload data.

Moreover, the measuring unit preferably provides a display device, on which it displays the quality of the channel-quality feedback value of the mobile station. A very simple operation of the measuring device is possible in this manner.

BRIEF DESCRIPTION OF THE DRAWINGS

The invention is described below by way of example on the basis of the drawings, in which an advantageous exemplary embodiment of the invention is presented. The drawings are as follows.

DETAILED DESCRIPTION

Initially, the structure and functioning of MIMO communications systems is explained on the basis of FIGS. 1-3b. With reference to FIG. 4, the structure and functioning of the measuring device according to the invention is then presented. Finally, on the basis of FIG. 5, the functioning of the measuring method according to the invention is presented. In similar drawings, the presentation and description of identical elements has not been repeated in some cases.

Figure 1:
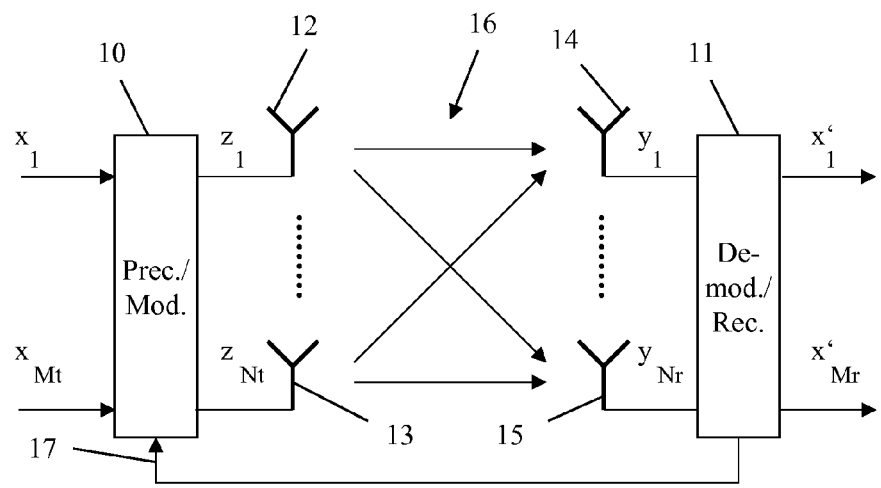
FIG. 1 shows and exemplary MIMO transmission system.

In FIG. 1, an exemplary MIMO transmission system is presented. From a data source, which is not illustrated here, for example, a base station, several data streams $x_1$-$x_{MT}$ are generated and transmitted to a pre-coding modulation device 10 (pre-coding modulation device). The pre-coding modulation device 10 (pre-coding modulation device) distributes the several signals $x_1$-$x_{MT}$ to several signal outputs and implements a pre-coding (pre-coding). That is to say, the individual signals $x_1$-$x_{MT}$ are weighted with weighting factors and in some cases combined. This will be presented in greater detail with reference to FIG. 2. Within the pre-coding modulation device 10 (pre-coding modulation device), digital output signals for a plurality of antennas 12, 13 are accordingly obtained.

The digital output signals are modulated by the pre-coding modulation device 10 (pre-coding modulation device) to form analog output signals $z_1$-$z_{MT}$. These signals $z_1$-$z_{MT}$ are supplied to the several transmission antennas 12, 13. The transmission antennas 12, 13 transmit the modulated signals $z_1$-$z_{MT}$. The transmission antennas 12, 13 are not disposed in the same spatial position. Accordingly, different transmission channels 16 are obtained for a plurality of reception antennas 14, 15. An optimal transmission is obtained if the signals which are transmitted from one transmission antenna 12, 13 are received exclusively by one reception antenna 14, 15. However, this is generally not the case, because the signals of the transmission antennas 12, 13 are received by several reception antennas 14, 15.

The analog signals $y_1$-$y_{MT}$ received by the reception antennas 14, 15 are transmitted by the reception antennas 14, 15 to a demodulation reception device 11. The demodulation reception device 11 initially demodulates the analog signals $y_1$-$y_{MT}$ and then reconstructs the transmission signals $x_1$-$x_{MT}$. It outputs the reconstructed transmission signals $x'_1$-$x'_{MT}$ to a data sink, for example, a mobile station.

The quality of the transmission in this context is significantly influenced by how strongly the signals from the individual transmission antennas 12, 13 are received in a bundled manner by individual reception antennas 14, 15. If the optimal case is present that the signals of one transmission antenna 12, 13 are received only by one reception antenna 14, 15, then a completely independent transmission channel is obtained for each pair of transmission antenna 12, 13 and reception antennas 14, 15. The capacities of the transmission channels are therefore added. However, if there is no concentration of the transmitted signals to individual reception antennas 14, 15, the overall capacity of the transmission is significantly reduced.

From the received signals, the demodulation reception device 11 further determines a channel-quality feedback value, which it transmits via a further communications channel 17 back to the pre-coding modulation device 10 (pre-coding modulation device) at the transmission end. The pre-coding modulation device 10 (pre-coding modulation device) adjusts the pre-coding (pre-coding) and the modulation in such a manner that an optimal transmission is achieved with the given channel quality, which is fed back by the demodulation reception device 11. The demodulation reception device 11 determines the channel-quality feedback value on the basis of the signal-noise ratio of the individual reception antenna 14, 15 with known transmission symbols. The measuring unit according to the invention uses the orthogonality of the transmission channel 16 as an alternative for determining the channel-quality feedback. A use of the orthogonality for determining the channel-quality feedback value by the mobile station is also possible.

Figure 2:
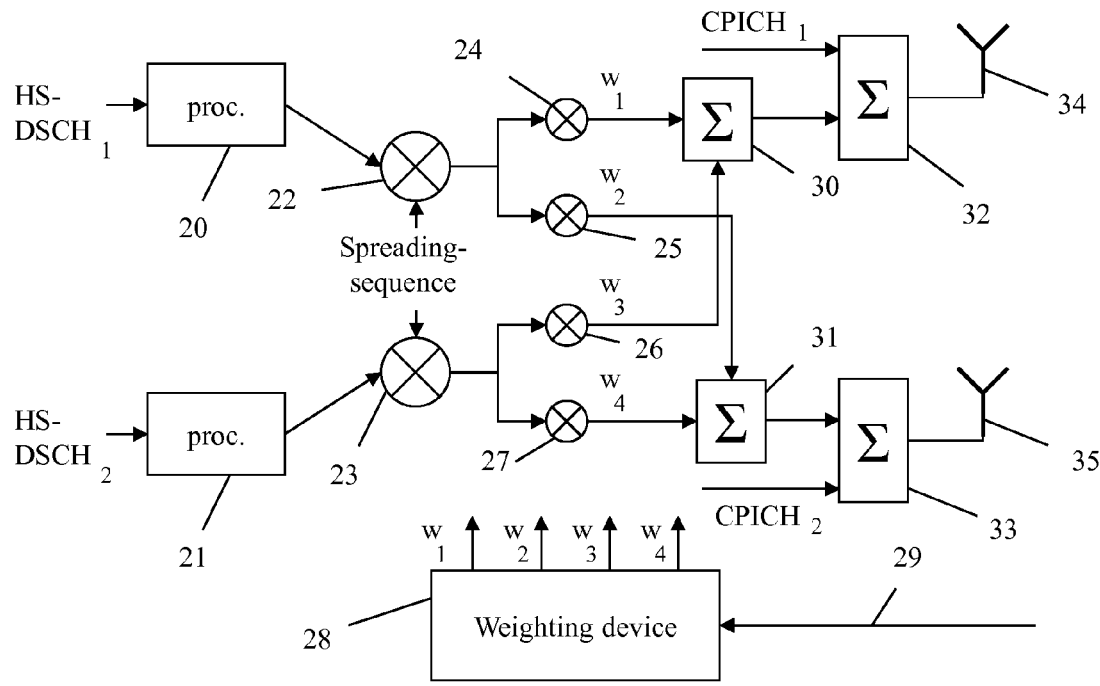
FIG. 2 shows a block-circuit diagram of the exemplary MIMO transmission system.

FIG. 2 shows the transmission portion of an exemplary MIMO transmission system. The transmission system used here comprises two transmission antennas 34, 35. However, an expansion to a larger number is readily conceivable. Furthermore, the transmission system comprises two transport-block processing devices 20, 21. These are each connected to a mixer 22, 23. The mixers 22, 23 are each connected to two mixers 24, 25, 26, 27. In this context, the mixer 22 is connected to the mixers 24, 25, while the mixer 23 is connected to the mixers 26, 27. The mixers 24, 26 are connected to the adder 30. The mixers 25, 27 are connected to the adder 31. The adder 30 is further connected to the adder 32. The adder 31 is further connected to the adder 33. The adders 32, 33 are each connected via modulation devices which are not illustrated to the transmission antennas 34, 35.

Moreover, a weighting device 28 is connected to the mixers 24-27. The weighting device 28 is further connected via a communications connection 29 to the reception end of the transmission.

A first transport block $HS\text{-}DSCH_1$ (high-speed downlink shared channel 1) is supplied to the transport block processing device 20. A second transport block $HS\text{-}DSCH_2$ (high-speed downlink shared channel 2) is supplied to the second transport-block processing device 21. The transport-block processing devices 20, 21 process the transport blocks $HS\text{-}DSCH_1$, $HS\text{-}DSCH_2$ further. The transport blocks $HS\text{-}DSCH_1$, $HS\text{-}DSCH_2$ in this context are combined by the transport-block processing devices 20, 21 to form continuous signals suitable for further processing. The signals are rerouted by the transport-block processing devices 20, 21 to the mixers 22, 23. To increase the spectral width and/or for encoding, the signals are mixed by the mixers 22, 23 with a spreading sequence. In this context, the spreading sequence is a digital signal, of which the clock rate is significantly higher than the clock rate of the signals transmitted by the transport-block processing devices 20, 21. The resulting signals of the mixers 22, 23 are supplied to the further mixers 24-27. The signal of the mixer 22 is supplied to the mixer 24 and 25, while the signal of the mixer 23 is supplied to the mixers 26, 27. The mixers 24-27 mix the signals in each case with a weighting signal $w_1$-$w_4$.

The weighting signals $w_1$-$w_4$ in this context are generated by the weighting device 28. The weighting device 28 generates the weighting signals $w_1$-$w_4$ on the basis of a channel-quality feedback value, which is transmitted via a communications connection 29 from the reception end of the communications device.

The weighted output signals of the mixers 24-27 are supplied to the adders 30, 31. In this context, the signals of the mixer 24 and the mixer 26 are supplied to the adder 30. The signals of the mixer 25 and of the mixer 27 are supplied to the adder 31. The signals at the output of the adder 30, 31 comprise largely payload data. They are supplied to the adders 32, 33, which in each case add pilot signals $CPICH_1$, $CPICH_2$ (common pilot channel 1, 2). The resulting signals of the adders 32, 33 are modulated in each case by modulation devices not illustrated here to form an analog signal and supplied to the transmission antennas 34, 35. The transmission antennas 34, 35 transmit the resulting signal in each case.

Through the weighting signals $w_1$-$w_4$, the distribution of the signals to be transmitted between the two transmission antennas is adjusted. An optimal use of the channel capacity is obtained in this manner. The channel-quality feedback value is also used by the modulation devices, which are not illustrated here, to determine the modulation method to be used.

Figure 3A:
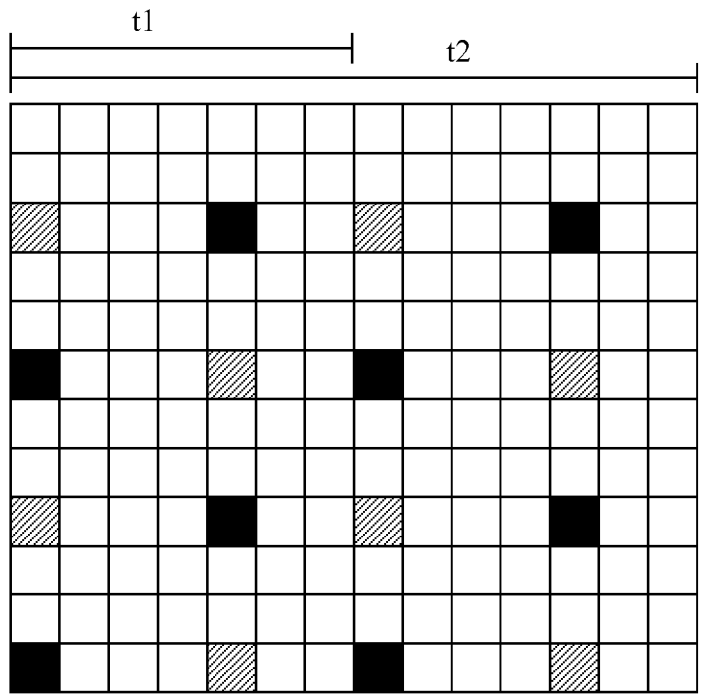
FIG. 3a shows a first transmission pattern of the exemplary MIMO transmission system.
Figure 3B:
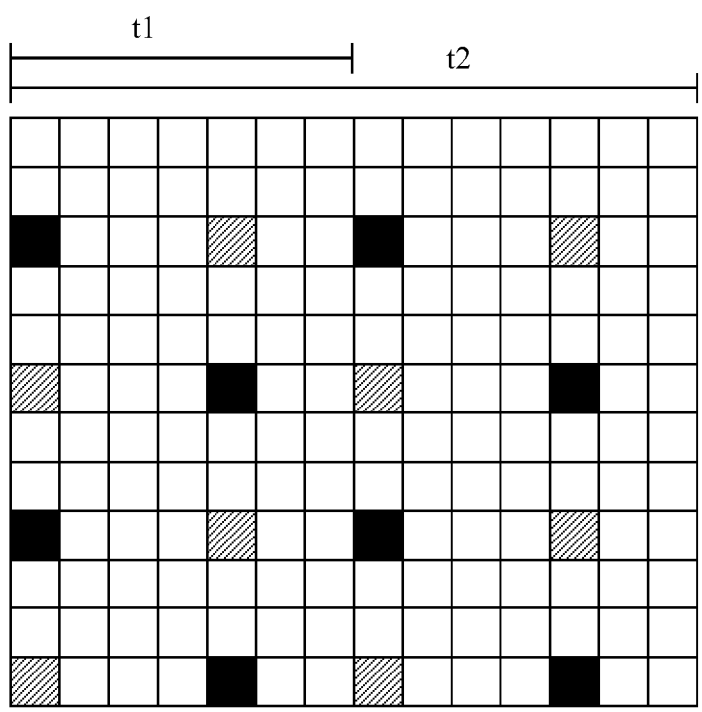
FIG. 3b shows a second transmission pattern of the exemplary MIMO transmission system.
Figure 4:
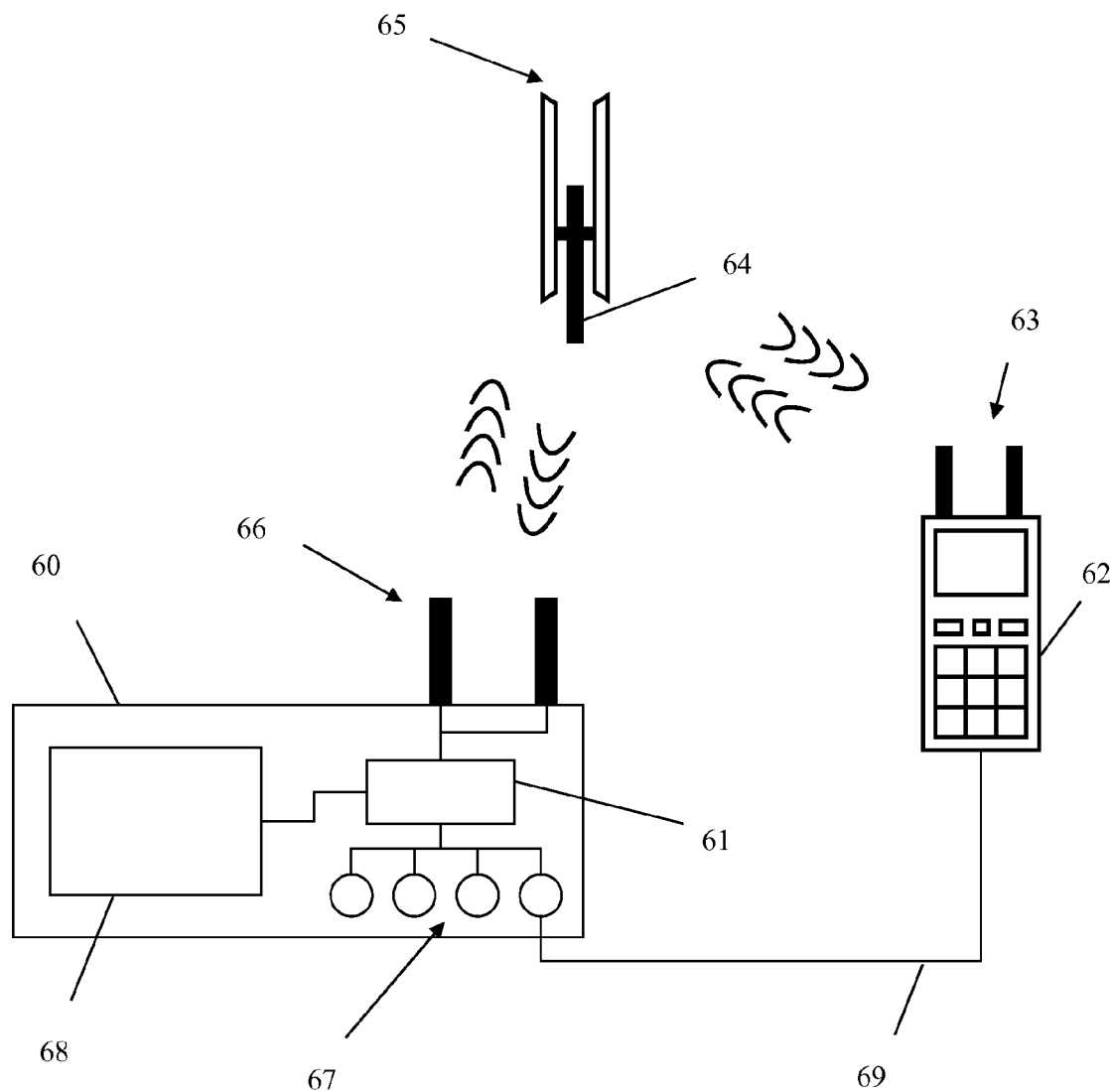
FIG. 4 shows an exemplary embodiment of the measuring device according to the invention.

FIGS. 3a and 3b present exemplary transmission signals in a MIMO transmission system in the time and frequency domain. Accordingly, FIG. 3a shows the signal transmitted by a first transmission antenna, while FIG. 3b shows the signal transmitted by a second transmission antenna. The time course of the transmitted signal is presented on the ordinate. In each case the frequency is plotted on the abscissa. The time duration $t_2$ here corresponds to a subframe (subframe), which has a length of, for example, one millisecond. The time duration $t_1$ corresponds to a time slot (timeslot) which corresponds to a length of, for example, 0.5 milliseconds. The individual blocks 40, 41, 42, 50, 51, 52 in this context are portions within the time and frequency domain, which can be filled with data to be transmitted.

In FIG. 3a, the blocks 41 represent blocks provided for the transmission of payload data. The blocks 40 here are used for the transmission of reference symbols. The blocks 42 are not used for the transmission of signals. In FIG. 3b, the blocks 51 are used for the transmission of payload data, while the blocks 50 are used for the transmission of reference symbols. The blocks 52 are not used here for the transmission of signals. The reference symbols, which are transmitted in the blocks 40, 50, are specified in advance, that is, the receiver already knows before the reception of the reference symbols 40, 50, which symbol is expected.

The signals of the two transmission antennas, which are illustrated in FIGS. 3a and 3b, are transmitted simultaneously by the transmission antennas. The reference symbols 40, 50 and the blocks 42, 52 not used for the transmission of symbols always differ from one another. In the case of a single datastream transmission (single stream transmission) the payload data 41, 51 transmitted simultaneously from the two transmission antennas are identical. If a dual datastream transmission (dual stream transmission) is present, the payload data 41, 51 which are transmitted simultaneously from the two transmission antennas differ from one another. Accordingly, the transmitted signals differ both in the case of single stream transmission (single stream transmission) and also in the case of dual stream transmission (dual stream transmission).

FIG. 4 shows an exemplary embodiment of the measuring device. In this context, a mobile station 62 is in a communications connection with a base station 64. The mobile station 62 provides at least two antennas 63. The base station 64 also comprises at least two antennas 65. The mobile station 62 is connected to a measuring unit 60. The connection in this case is implemented, for example, by means of a line 69 and a connection 67 of the measuring unit 60. The measuring unit 60 further comprises a processing device 61, at least two antennas 66 and a display device 68. The connections 67 are connected to the processing device 61. The antennas 66 and the display device 68 are also connected to the processing device 61. The measuring unit 60 also receives signals from the base station 64 by means of its antennas 60. However, in this context, it is not disposed in a communications connection with the base station 64. In an alternative embodiment, the measuring unit 60 sets up a standing communications connection with the base station 64.

With its at least two antennas 65, the base station 64 transmits signals such as those shown with reference to FIGS. 3a and 3b. The signals are transmitted via a communications channel which provides a loss factor. In real conditions, it is not certain that the signals of one transmission antenna 65 are received in each case only by one reception antenna 63 of the mobile station 62 or respectively one reception antenna 66 of the measuring unit 60. The higher the orthogonality of the propagation paths of the two transmission antennas to one another is, the smaller the mutual impairment of the transmitted data streams will be. The orthogonality of the propagation paths is accordingly a good measure for the quality of the transmission channel.

As shown with reference to FIGS. 3a and 3b, in the case of modern communications methods, for example 3G, HSPA, LTE, different reference signals or pilot signals are transmitted via the two antennas. On the basis of a channel estimation, which is based on these reference signals or pilot signals, the orthogonality of the two antenna signals relative to one another can be determined at the reception site. Through the channel estimation on both antennas, the complete channel matrix can be estimated as follows:

$$\begin{pmatrix} h_{11} & h_{12} \\ h_{21} & h_{22} \end{pmatrix}.$$

A measure for the orthogonality of the antenna paths is, for example, the invertibility of the matrix. The orthogonality can also be inferred by comparing the coefficients $h_{12}$ and $h_{21}$.

By means of its at least two reception antennas 63, the mobile station 62 receives the signals transmitted by the base station 64 by means of its two transmission antennas 65. On the basis of the known pilot symbols or reference symbols, the mobile station 62 implements a channel estimation. In this context, it determines at least the channel-noise ratio. In an alternative embodiment, the mobile station 62 additionally determines the orthogonality of the two antenna signals at the reception site from the channel estimation. Starting from the channel estimation or starting from the orthogonality, the mobile station 62 determines a channel-quality feedback value (channel-quality feedback value), which it transmits via the transmission line 69 to the measuring unit 60. The measuring unit 60 receives the channel-quality feedback value via a connection 67 and reroutes it to the processing device 61.

At the same time, the measuring unit 60 receives, by means of its two reception antennas 66, the signal transmitted by the base station 64 by means of its two transmission antennas 65. Like the mobile station 62, the measuring unit 60 implements a channel estimation on the basis of the known reference or pilot signals. In this context, the measuring unit 60 provides a significantly higher precision than the mobile station 62. The processing device 61 of the measuring unit 60 receives the signals received from the transmission antennas 66 and implements the channel estimation. The processing device 61 further determines the orthogonality of the received signals starting from the channel estimation. Moreover, the processing device 61 of the measuring unit 60 compares the self-determined orthogonality of the received signals with the channel-quality feedback value transmitted from the mobile station 62. If the channel-quality feedback values of the mobile station 62 are orthogonality values, this comparison can be implemented directly. If the channel-quality feedback values of the mobile station 62 are signal-noise values, these are converted into a compatible format before the comparison. This can be implemented, for example, by multiplication, logging, exponentiation or addition.

The processing device 61 reroutes to the display device 68 the data it has determined and/or the quality-feedback values transmitted from the mobile station. The measuring unit 60 presents these data on the display device 68.

If the measuring unit 60 and the mobile station 62 are disposed in close spatial proximity, the transmission channels from the base station 64 to the mobile station 62 and to the measuring unit 60 are comparable. By comparing the channel-quality feedback value of the mobile station 62 with an ideal channel-quality feedback value determined by the measuring unit 60, the quality of the channel-quality feedback of the mobile station can be determined. A measurement for this quality is also displayed by the measuring unit 60 on the display device 68.

Figure 5:
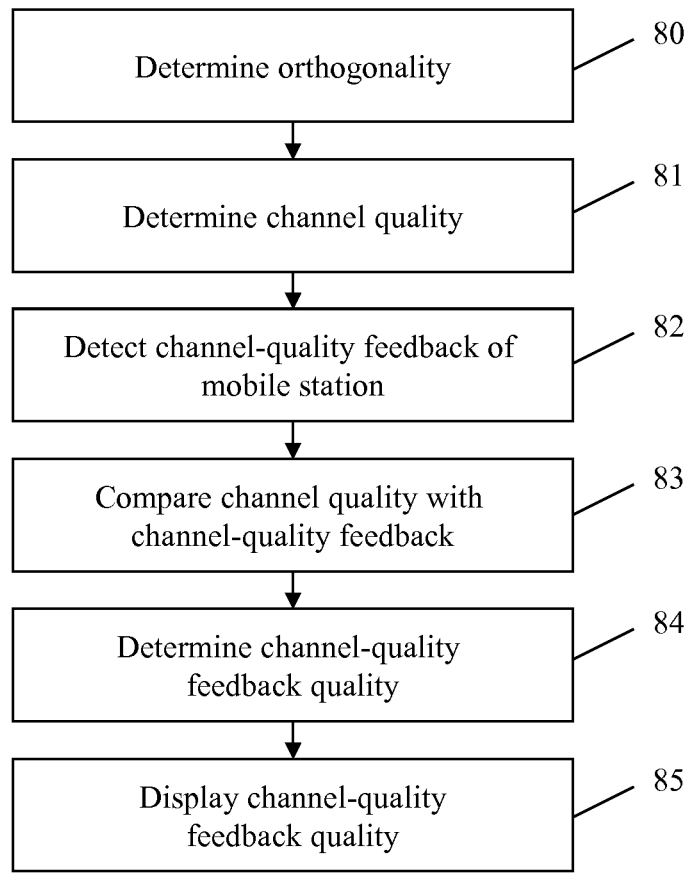
FIG. 5 shows an exemplary embodiment of the measuring method according to the invention.

FIG. 5 shows an exemplary embodiment of the measuring method according to the invention. In a first step 80, the orthogonality of two signals transmitted by a base station is determined. Starting from the orthogonality of the two signals, the channel quality of the transmission channel from the base station to the reception site is determined in a second step 81. In a third step 82, the channel-quality feedback value of a mobile station is determined That is to say, a mobile station also receives the signals transmitted from the base station and determines from these a channel-quality feedback value, which is registered in this step. In a fourth step 83, the channel-quality feedback value determined on the basis of the orthogonality is compared with the channel-quality feedback value of the mobile station. In a fifth step 84, the quality of the channel-quality feedback value of the mobile station is determined on the basis of the comparison of the channel-quality feedback values. In a final sixth step 85, the quality of the channel-quality feedback value of the mobile station is displayed.

The invention is not restricted to the exemplary embodiment illustrated. Accordingly, the invention can be used with all communications methods which utilize MIMO. An expansion to a larger number of antennas is also possible. All of the features described above or illustrated in the drawings can be advantageously combined with one another as required within the framework of the invention.

The invention claimed is:

1. An apparatus, comprising:
a mobile station, including at least two antennas, wherein the mobile station is configured to determine a first channel quality feedback value based on signals received from a base station via the antennas of the mobile station; and
a measuring unit disposed in close spatial proximity to the mobile station, including a processing device and at least two antennas, wherein the processing device is configured to determine an orthogonality of signals received from the base station via the antennas of the measuring unit, to determine a second channel quality feedback value based on the determined orthogonality having a significantly higher precision than the first channel quality feedback value, and to determine a quality of the channel quality feedback value of the mobile station by comparing the determined second channel quality feedback value with the first channel quality feedback value of the mobile station.

2. The apparatus of claim 1, wherein the mobile station is further configured to determine a signal to noise ratios based on the received signals, and to determine a third channel quality feedback value based on the determined signal to noise ratio.

3. The apparatus of claim 1, wherein the mobile station is further configured to determine an orthogonality of the received signals, and to determine a third channel quality feedback value based on the determined orthogonality.

4. The apparatus of claim 1, wherein the measuring unit further includes an interface configured to receive the first channel quality feedback value from the mobile station.

5. The apparatus of claim 1, wherein the determination of the orthogonality by the processing device is based at least in part on known signal portions of the received signals.

6. The apparatus of claim 1, wherein the mobile station is further configured to establish a communications connection to the base station, and the determination of the orthogonality by the processing device is based at least in part on control channel signals received from the base station.

7. The apparatus of claim 1, wherein the mobile station is further configured to establish a communications connection to the base station, and the processing device is further configured to establish a communications connection to the base station.

8. The apparatus of claim 1, wherein the measuring unit further includes a display device, and the processing device is further configured to cause a display of the quality of the channel quality feedback value of the mobile station via the display device.

9. A method, comprising:
determining, by a mobile station, a first channel quality feedback value based on signals received from a base station via at least two antennas of the mobile station,
determining, by a processor of a measuring unit disposed in close spatial proximity to the mobile station, orthogonality of signals received from the base station via at least two antennas of the measuring unit,
determining, by the processor of the measuring unit, a second channel quality feedback value based on the determined orthogonality having a significantly higher precision than the first channel quality feedback value, and
determining a quality of the channel quality feedback value of the mobile station by comparing the determined second channel quality feedback value with the first channel quality feedback value of the mobile station.

10. The method of claim 9, further comprising:
determining, by the mobile station, a signal to noise ratio based on the received signals; and
determining, by the mobile station, a third channel quality feedback value based on the determined signal to noise ratio.

11. The method of claim 9, further comprising:
determining, by the mobile station, an orthogonality of the received signals; and
determining, by the mobile station, a fourth channel quality feedback value based on the determined orthogonality.

12. The method of claim 9, wherein the determination of the orthogonality by the processor of the measuring unit is based at least in part on known signal portions of the received signals.

13. The method of claim 9, further comprising:
establishing a communications connection between the mobile station and the base station; and
wherein the determination of the orthogonality by the processor of the measuring unit is based at least in part on control channel signals received from the base station.

* * * * *